Patented July 4, 1944

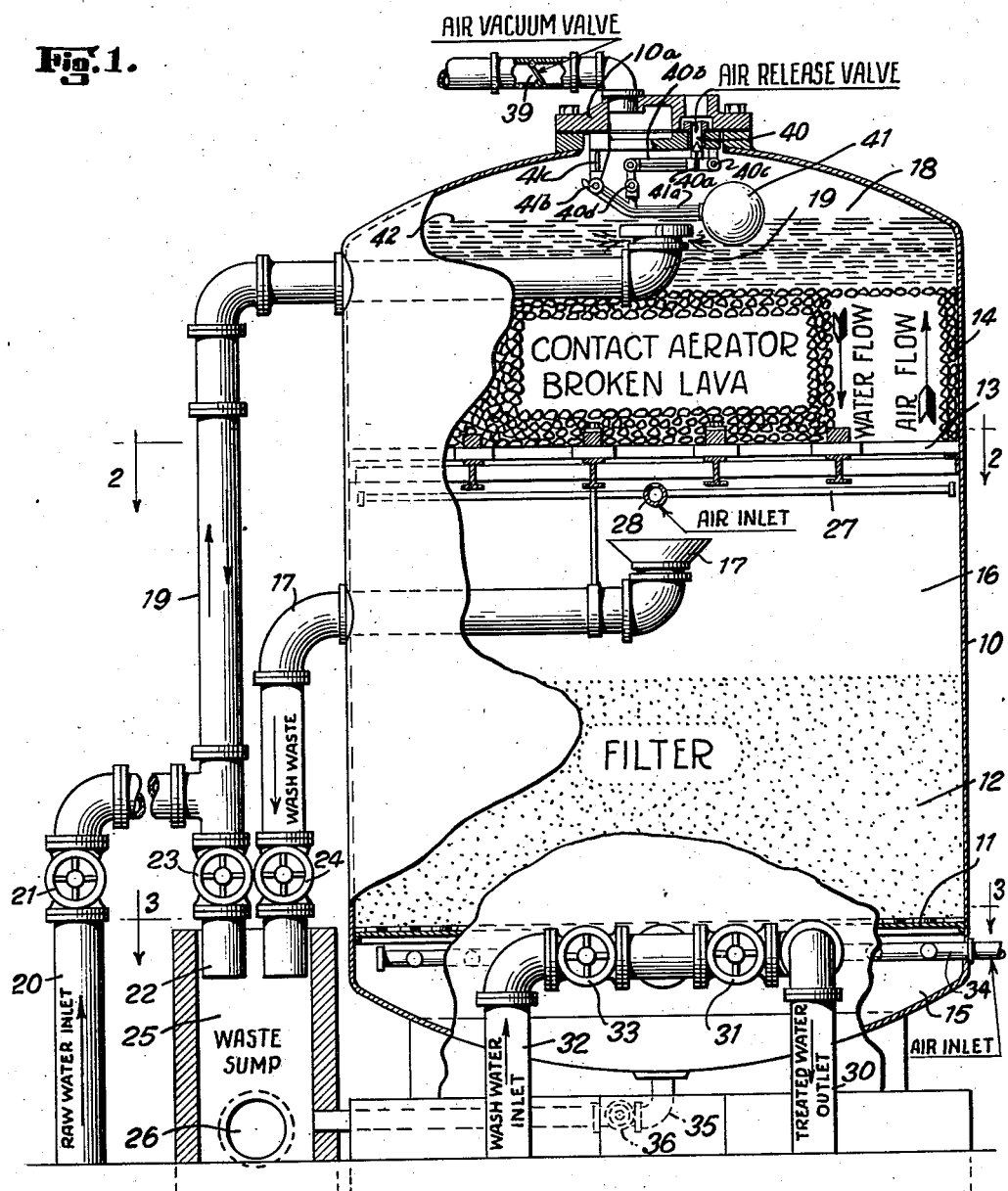

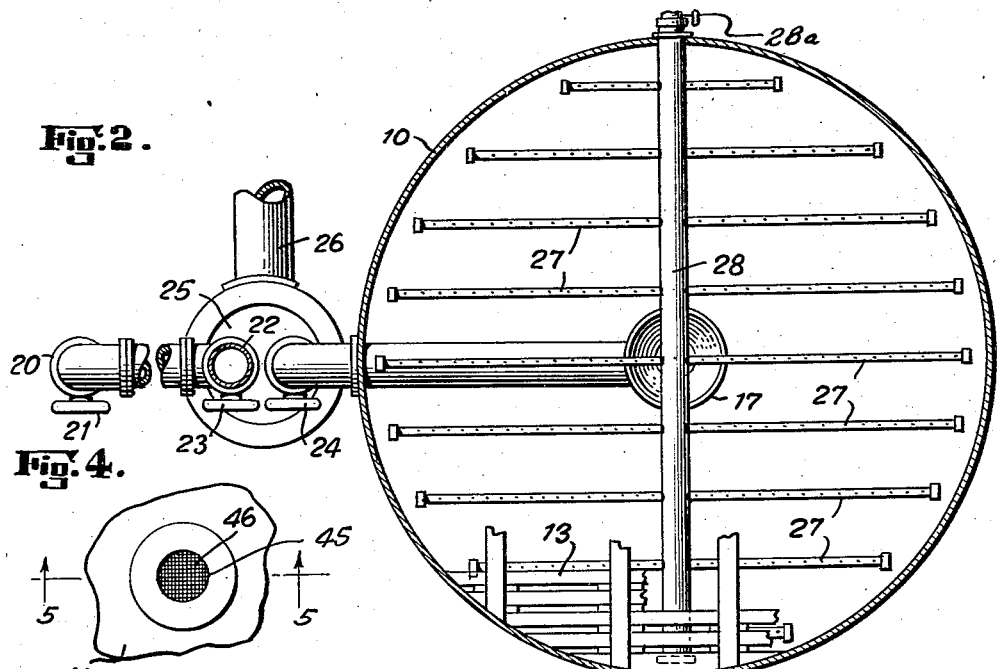
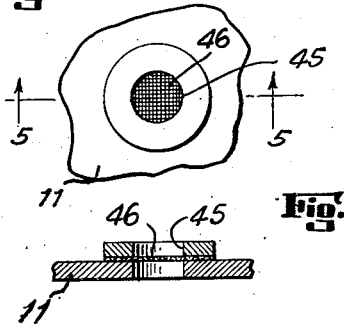
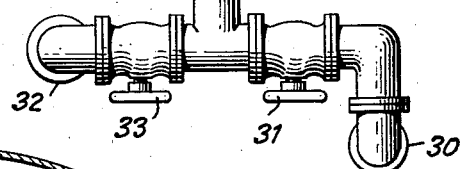
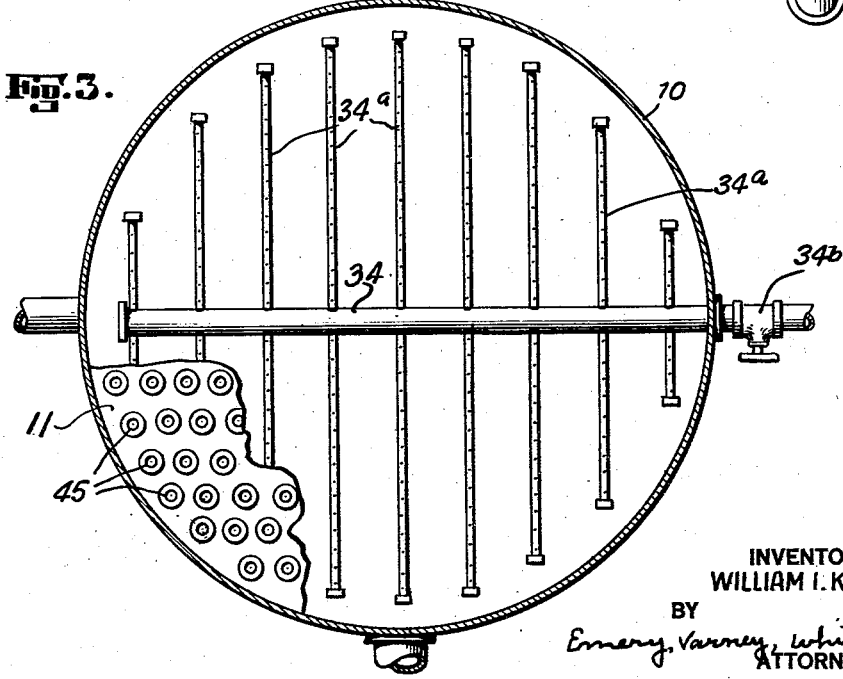

2,352,901

UNITED STATES PATENT OFFICE 2,352,901

APPARATUS FOR TREATING WATER

William I. Klein, East Orange, N. J., assignor to Medford Engineering Co., Medford, N. J., a corporation of New Jersey Application July 1, 1940, Serial No. 343,376

3 Claims. (Cl. 210—26)

This invention relates to methods and apparatus for treating water, particularly for the removal of iron and acidity and has for an object the provision of improvements in this art.

The usual method of removing iron and acidity from water is to aerate it as by spraying it under pressure into the open air, then filtering it through beds of graded gravel and sand. The water must be re-pumped after the aeration treatment and commonly is given a milk of lime treatment to further remove acidity. The filter beds have to be washed after a certain period of use to remove the sludge material, and great care has to be maintained to prevent disturbing the graded layers of gravel and sand.

Open air aeration has a number of disadvantages. It is subject to freezing conditions in cold weather; it wastes much water into the passing air currents; it takes up contamination from the air, in some hot countries this being so great that it is impossible to use open air aeration; its efficacy varies with barometric and temperature conditions; and it requires re-pumping of the treated water.

According to the present invention the water is aerated in an improved manner in a closed container under pressure. This eliminates re-pumping; the pressure can be accurately controlled; there is no chance of contamination because pre-treated and sterilized air can be employed; and the contact currents of air and water can be accurately controlled and are not subject to the variations due to gusts and swirls of air as in the open aeration plant.

With the idea of eliminating the disadvantages of open air aeration certain forms of pressure aerating plants have heretofore been proposed.

The present invention in addition provides for sludge removal and acid elimination in the same apparatus at the same pressure and without re-pumping. A considerable portion of the sludge which is produced by aeration is removed in the portion of the apparatus where the aeration occurs; and the remainder is taken out in a uniform bed of sand which is not injured for its intended purposes by being mixed during washing, as a graded gravel layer filter would be.

The invention also provides for complete acid removal in the same sand filter bed which is used for sludge removal, there being used or mixed with the sand a suitable corrective material such as marble, calcite, a specially treated silica sand, or a specially prepared granular dolomitic material which does not settle out like lime and which consequently maintains its effect and prevents incrustations and corrosion throughout the pipe distributing system and avoids red water even at great distances from the treating plant. Moreover, the sand by being mixed with the granular treating material has a scrubbing effect on the latter during washing to keep it clean and active.

The apparatus provides for automatic vacuum relief when the raw water supply is cut off and the sludge-containing water is drained from the aeration contact bed which is employed.

The invention provides for washing the filter-treating bed with air or water or both at any desired pressure. If desired the same treatment may be given the aeration contact bed.

In the manner in which the acid-removing material is used herein it tends to maintain uniform efficacy in all stages of use from the time the bed is freshly charged until practically all of the material has been used up. This is true because the smaller particles tend to rise to the top and collect more closely together so as to contact the water more thoroughly, and the particles soon assume their natural relative position even though the filter bed may be completely upset during washing. Therefore, while the coarse particles are rather uniformly distributed throughout the entire depth of the filter bed when first charged and act over a greater distance, the smaller particles become more closely collected near the top during later stages after each successive washing and act more effectively though for a shorter distance. Finally almost all the material may be collected near the top of the filter bed just before exhaustion but it will be in such fine particles and so closely collected that it will still have practically the same full effect as when the coarser particles were freshly charged.

Other features, objects and advantages of the invention will be apparent from the following description of an illustrative embodiment thereof, when considered in connection with the preferred form of apparatus shown in the accompanying drawings in which:

Fig. 1 is a vertical section, partly in elevation, showing a water treating plant embodying and suitable for practicing the present invention;

Fig. 2 is a broken horizontal section taken on the line 2—2 of Fig. 1;

Fig. 3 is a broken horizontal section taken on the line 3—3 of Fig. 1;

Fig. 4 is an enlarged partial horizontal plan view of parts shown at the left side of Fig. 3; and Fig. 5 is a vertical section taken on the line 5—5 of Fig. 4.

Referring to the drawings, a closed tank 10 is provided with a lower false-bottom or grid 11 adapted to retain thereon a filter bed 12 of granular material such as sand or a dolomitic or other granular treating material or preferably a mixture of the two granular materials for a purpose which will be more fully explained hereinafter. This filter bed may, for example, be 48 inches deep for a tank which is, say, 9 feet in diameter.

At some distance above the filter bed there is located another false-bottom or grid 13 such as a wood slatting adapted to retain thereon a bed 14 of a coarser broken material, preferably a porous material such as lava or slag. This portion of the apparatus will be referred to as the contact aerator.

In the bottom of the tank there is an open space 15 for the collection of treated water; in the center there is an open space 16 for the collection of wash water, a wash waste pipe 17 opening thereinto; and in the top of the tank there is an open space into which the raw water inlet pipe 19 opens to supply water under pressure which partially fills the space, leaving a space 18 for air under pressure. The pipe 19 is provided with a distributor head with openings around the side to spread the water evenly and smoothly across the entire space in the tank. Preferably the inlet openings are below the water level in the tank, as illustrated. The water inlet pipe 19 may also serve at times as a wash water drain pipe when the aeration bed is being back-washed. For this purpose the raw water supply pipe 20 which connects with the raw water inlet pipe 19 is provided with a cut-off valve 21 and the aerator waste pipe 22 which also connects with the raw water inlet pipe 19 is provided with a cut-off valve 23. The wash waste pipe 17 is provided with a cut-off valve 24. Both the wash waste pipe 17 and the aerator waste pipe 22 empty into a waste sump 25 connected with a sewer 26.

Beneath the upper grid 13 an air supply spreader, comprising laterals 27 supplied by a pipe 28 having a cut-off valve 28a (Fig. 2), is provided for spreading air evenly below the entire area of the contact aerator or lava bed 14 to meet the evenly spread out water descending through the many and tortuous spaces in the lava bed.

A treated water outlet pipe 30 leads from the collector space 15 and this pipe is provided with a cut-off valve 31. Opening into the same space is a wash water inlet pipe 32 provided with a cut-off valve 33. Also opening into the space 15 is an air wash inlet pipe 34 opening into spreaders 34a, and provided with a cut-off valve 34b as shown in Fig. 3. A drain pipe 35 leads from the bottom of the space 15 to the waste sump 25. The drain pipe is provided with a cut-off valve 36.

In the top of the tank there is placed an air vacuum relief valve 39 of sufficient size to permit rapid draining of water from the tank. There is also an air release valve 40 which may be controlled by a float 41. When the air pressure becomes too great it forces down the water level, indicated by 42, and permits air to escape until the pressure is equalized at the proper point.

The air release valve 40 has only a small opening, and this is as large as required because the entrapped air which it permits to escape during aeration is under relatively high pressure. But when the water in the tank is to be suddenly drained to cause it to rush down through the bed 14 and remove sludge, the opening of valve 40 would be too small to permit air at atmospheric pressure to enter rapidly in sufficient amount to avoid a partial vacuum which would retard the draining of the water. Wherefore, the relatively large relief pipe and relief valve 39 are provided to permit air at atmospheric pressure to enter as fast as the water can flow out.

In normal operation for treating water, the raw water inlet valve 21 is open, the aerator waste valve 23 closed, the wash waste valve 24 closed, the treated water outlet valve 31 open, the wash water inlet valve 33 closed, the drain valve 36 closed, the valve 34b of the air wash supply pipe 34 closed, and the valve 28a of the aeration pipe 28 open.

Raw water will then issue from the distributor head of the raw water inlet pipe 19 so as to be spread evenly across the tank above the lava bed or contact aerator 14 and flows down uniformly through the lava bed where it meets the uniformly distributed air flowing upward from the air spreader 27 and forms an emulsion therewith. At the start the valve 40 is fully open and air escapes freely from the top of the tank so that the tank air pressure is only slightly above atmospheric pressure, though supplied by pipe 28 at a high pressure and in constant inflow. However, as the water level rises it will raise the float 41 and restrict the passage at valve 40 until a balance is established between water and air pressures.

For the aeration bed there is used cracked and graded honeycomb lava having a specific gravity sufficient to overcome floating and maintain a fixed position. This works better after it has been in use for some time, apparently after becoming coated thoroughly with sludge. There appears to be some catalytic action over the extremely large contact area presented in the honeycomb lava and other highly porous material of this type, but this action need not be investigated, it being sufficient to know that the desired action does occur. This porous and divided material breaks up the downflowing water into a great number of very small streams that thoroughly contact and mix with globules of ascending air to form the desired emulsion. This causes the oxidation of iron and manganese in the water; converts the iron content from a condition of solution to a state of suspension; and at the same time causes the gases in the water to be released and carried off by the ascending air. The lava bed also acts as a sedimentation basin to remove and store a considerable portion of the oxidized iron removed from the water. This may amount to 40 or 50% of that removed.

The aeration may be accomplished under any working pressure that may be required and under any conditions of the water supply system. The upflowing air accomplishes its purpose without causing any stoppage or retardation of the flow of water. Very accurate control of the pressures and amounts of water and air flow can be maintained so that any desired period or condition of contact may be maintained.

The quality as well as the quantity of the air may be accurately controlled. All the compressed air is filtered, freed from entrained vaporized oil particles, purified, and so regulated that oxidation can be accomplished without leaving excessive amounts of oxygen in the water, thus leaving it in a less aggressive condition.

The used air with entrained gases accumulates in the air space 18 in the top of the tank and when the predetermined pressure is exceeded escapes through the air release valve 40.

In operation, a closely maintained working balance is achieved wherein the float 41 remains substantially at a constant position to release air through the valve 40 continuously at the rate at which it enters through the inlet pipe 28. The float 41 is disposed in a position where it will not be materially affected by any turbulence which may be caused by the flow of water or air. For clarity of illustration it is shown at one side of the end of water inlet pipe 19, but in practice for very smooth operation it may be placed directly above the cover plate of the pipe, the quiet body of water above this plate being of sufficient depth to permit the required movements of the float.

The linkage through which the float 41 actuates the closure member or plug 40a of the valve 40 is very similar to that of float valves used for many other purposes. Here the float 41 is secured on an arm 41a pivoted at 41b to a fixed support 41c carried by the removable cap 10a. The valve plug 40a is secured to a valve arm 40b which is pivoted to a support on the cap 10a at 40c. A link 40d is pivotally connected to the outer end of the valve arm 40b and to an intermediate part of the float arm 41a.

The filter bed 12 performs two functions. It removes most of the oxidized iron and manganese which was not deposited in the aeration bed 14 and it brings the water to a state of carbonate stability. That is, the water is freed of the remaining sludge and is made non-corrosive in character. The treated water flowing from the apparatus is therefore perfectly clear and will not incrust or corrode pipes, even those made of iron, for any usual distances from the treating plant. Red water, which is common with water obtained from other treatments, is therefore avoided by this treatment.

The entire area and depth of the filter bed is effectively utilized and this is realized because the entire bed is able to rid itself of all the suspended oxide (of iron, manganese, etc.) taken from the water. This is done in such manner that the filtering medium is maintained in a clean, uncoated and active condition. The bed does not employ the so-called standard underdrain comprising manifolds and laterals and layers of graded gravel, but instead it employs a continuous bed of sand and/or a corrective material such as a durable specially treated dolomitic material which is entirely soluble but which maintains a hard outer surface until it is entirely used up. A preferred form of dolomitic material and its production are disclosed in the co-pending application of Frederick Tschirner, Serial No. 336,007 filed May 18, 1940. The present invention provides an improved method of using this dolomitic material to obtain its full advantages. It is intimately mixed throughout the bed of sand; consequently when the bed is back-washed the hard particles of sand have an abrasive action on the dolomite grains, to free them from sludge and leave their outer surfaces clean and active. A similar, though less rapid, abrasive cleaning action is realized when the dolomitic material is used alone, the grains in agitation rubbing against each other to effect removal of softer outer portions or accretions.

When the bed is freshly charged with dolomitic material there is a uniform homogeneous mixture throughout the depth of the bed, the grains of dolomitic material being approximately of the same size and specific gravity as the sand grains.

The uniformity of grain size in the filter obtains complete removal of dirt and sludge from the particles by friction with the sand grains. More violent contact occurs between the grains by using slower water velocity combined with air than by high rate of flow of wash water alone.

During the operation of washing, the particles of corrective material, such as magnesite, marble or zeolite, become reduced in size and tend to form a chemically active layer on top of the filter bed. Thus is combined a chemical filter with a physical filter of coarser particles mixed with the sand bed below. But as the grains of dolomitic material become smaller they seek a higher level, particularly during the back-washing and finally may collect near the top just before exhaustion.

Thus the filter surface becomes charged with the finer particles of the corrective material to form a chemically active layer on top of the physical filter below and thus combines the properties of a chemical filter with a physical filter and obtains both absorptive action and straining action. Consequently the bed is very effective until practically completely exhausted.

When the contact aerator or lava bed is to be cleaned the treated water outlet valve 31 and the raw water inlet valve 21 are closed and the wash waste valve 24 is opened. The air to pipe 28 is also cut off. The water in the upper portion of the tank then drains rapidly out the wash waste pipe 17, the vacuum relief valve 39 opening wide to allow the rapid inflow of a large volume of air to displace the water. This draws most of the oxide sludge out of the lava bed. For further washing, the raw water valve 21 may be opened sufficiently to cause a flow of water down through the bed of lava to the wash waste pipe. For additional cleaning, a blast of air from the pipe 28 may be released into the bed when there is little or no water present therein.

The lava bed may be back-washed with air or water or both if desired. For this purpose (proceeding from the condition last stated above) the wash waste valve 24 is closed and the aerator waste valve 23 is opened, the raw water supply valve 21 remaining closed. For back-washing with water, the wash water inlet valve 33 is opened and water flows upward through the bed and out through pipe 19 to the sump 25. For back-washing with air, either alone or in conjunction with the water back-wash, the valve to air inlet pipe 28 is opened and the air flows upward through the bed and out the valve 40.

The release valve 40 is so designed that the air and entrained gases will be released with air supplied at pressures higher than the operating water pressure without interfering with the free flow of water through the system. This system may be operated with the aeration and lava bed in a separate unit ahead of one or more filter units or combined with a filter unit below the aeration chamber as herein described. Then the wash water inlet valve 33 is opened and also, if desired, the valves for air pipes 34 or 28 or both are opened. Or either or both air pipes may be supplied with air while the wash water inlet valve 33 is closed. This gives an air wash. In this action the filter bed 12 is also back-washed.

The filter bed alone may now be back-washed by closing the aerator waste pipe 23 and opening the wash waste valve 24.

When oxide sludge is to be washed downward from the filter bed the drain valve 36 is opened, all valves other than the vacuum valve 39 being closed, except that the raw water inlet valve 21 may be opened sufficiently to supply adequate wash water through the filter bed.

Suitable ports with closures are provided in the tank for removing old material and supplying new material. Practically the only new material to be supplied, except at very long intervals, of course, is the dolomitic or other corrective material.

The filter bed rests directly upon a false-bottom filter under-drain plate, and this drain plate separates the filter bed above from the clear water chamber below, access both downward, during normal operations, and upward, during back-washing operations, being provided by ports 45 in the filter under-drain plate which are covered with indestructible and non-clogging steel wire mesh 46. These details are shown in Figs. 3, 4 and 5.

The clear water basin below the false-bottom filter under-drain plate is provided with an air distribution grid which permits the application of compressed air and its utilization as an auxiliary filter bed washing and cleansing means. The air outlet openings are placed in the sides or bottom and not in the top of the grid to avoid too pronounced a blasting action but rather an evenly diffused flow of air. The filter bed is not injured by agitation in back-washing but a violent agitation such as might carry the small granular material out the waste openings is avoided.

The air outlet openings in the upper air grid 27 are preferably directed upward to forcibly blast the downflowing water in the lava bed, the material of the bed being sufficiently large and heavy to permit this and the downflowing water tending to counteract the effect of the upflowing air.

The system is not only effective in maintaining a clean filter unit but it accomplishes this with a material saving in the volume of wash water or waste required for this purpose as against the so-called standard system, which cannot use air effectively due to the use of graded layers of gravel. These graded layers and laterals are not employed in the present system, consequently the bed may be satisfactorily cleaned by air alone, by water alone, or by a combination of air and water.

The treatment provides effective and accurately controlled aeration, oxidation, release of entrained gases, removal of suspended oxidized iron by sedimentation, all under pressure and without pumpage. This is much more satisfactory than atmospheric aeration and sedimentation and eliminates the chance of incidental contamination from free air exposure, eliminates waste of water from exposed air currents, and eliminates atmospheric troubles due to freezing. It eliminates all variations due to changing barometric conditions that hinder successful aeration of water, and maintains a definite and proper degree of oxygen content which is always under control, a feature which cannot be controlled by atmospheric aeration.

In the enumerated and in other respects the apparatus and method have proved advantageous for the desired purposes.

While one embodiment of the invention has been described, it is to be understood that the invention may have various embodiments within the limits of the prior art and the scope of the subjoined claims.

I claim:

1. Apparatus for treating water, comprising in combination, a closed pressure vessel, an aeration bed of coarse porous granular material in said vessel disposed at a distance below the top, a valve-controlled raw water supply including a head above the aeration bed for spreading water under pressure uniformly across the top of said bed, a valve-controlled pipe for withdrawing treated water from the bottom of the tank, valve-controlled means including a spreader for supplying air under pressure uniformly across and below the aeration bed, the air collecting in the space in the top of the tank and affecting the level of water therein, an air outlet valve in the top of said vessel regulated by the water level to maintain a body of air in the top of the vessel above the water and aeration bed, the air in the aeration bed causing a sludge separation from the water, some of which sludge deposits in the aeration bed, a filter bed of fine granular material in said vessel disposed at a distance above the bottom to leave a clear water space therebelow, the filter bed also being spaced at a distance below said aeration bed, a valve-controlled wash waste pipe opening into the open space between beds, a valve-controlled wash water inlet opening into the bottom of the tank, and valve-controlled means for supplying air under pressure uniformly across and below the bottom of said filter bed.

2. Apparatus for treating water to remove iron and acidity, comprising in combination, a closed pressure tank, a wood slat grid near the top thereof supporting a bed of coarse lava to break up the flow of water and receive a deposit of sludge from iron removal, a metal grid near the bottom of said tank and including spaced ports covered with fine screen wire and supporting a filter bed of sand mixed with a fine granular correcting material, there being left a clear water space in the bottom, a drain space in the center, and an air space in the top of the tank, a pipe leading into the top of the tank and provided with valved pipe connections for supplying raw water to the tank or for draining back-wash water from the tank, the water level in normal operation being maintained above the lava bed, a valve wash waste pipe opening into the center drain space, a pipe opening into the clear water space provided with valved connections for withdrawing treated water or supplying wash water, a valved drain pipe in the bottom of the tank, valved air inlet pipes and spreaders for supplying air under pressure beneath each of said grids, a float controlled air release valve in the top of said tank, and an air vacuum relief valve also located in the top of said tank, all for the purposes set forth.

3. Apparatus for treating water to remove iron and acidity, comprising in combination, a closed pressure tank, a grid in the upper part of the tank supporting a bed of coarse granular material to break up the downflowing water and retain a deposit of sludge from iron removal, a grid near the bottom of the tank supporting a filter bed of fine granular material, there being left a clear water space below the filter bed in the bottom of the tank, a drain space and a valved wash waste pipe in the center of the tank between the upper grid and the filter bed, an open space for water and air in the top of the tank, pipe and valve means for supplying raw water to or draining backwash water from the top of the tank selectively, pipe and valve means for withdrawing treated water from or supplying wash water to the open space in the bottom of the tank, pipe and valve means for supplying air under the upper grid to flow upward through a body of water which submerges the upper bed and stands at a level thereabove and below the air space in the top of the tank, pipe and valve means for supplying air beneath the lower grid, a float control valve for releasing air from the top of the tank, and a vacuum relief valve for rapidly admitting air to the top of the tank to permit rapid withdrawal of water.

WILLIAM I. KLEIN.